US005575523A

United States Patent [19]

Keller

[11] Patent Number: 5,575,523

[45] Date of Patent: Nov. 19, 1996

[54] MOTOR VEHICLE AUXILIARY VISOR FOR BLOCKING OUT LOW INCIDENT SUN RAYS

[76] Inventor: Theodore F. Keller, 2416 Yorktown #379, Houston, Tex. 77056

[21] Appl. No.: 551,616

[22] Filed: Nov. 1, 1995

[51] Int. Cl.$^{6}$ .......... B60J 3/00

[52] U.S. Cl. .......... 296/97.7; 296/97.9

[58] Field of Search .......... 296/97.7, 97.9; 160/DIG. 3

[56] References Cited

U.S. PATENT DOCUMENTS

| | | | |
|---|---|---|---|
| 2,163,495 | 6/1939 | Levy | 296/97.5 |
| 2,549,395 | 4/1951 | Short, Sr. | 296/97.9 X |
| 2,620,222 | 12/1952 | Beauchamp | 296/97.9 X |
| 2,922,676 | 1/1960 | Czajkowski | 296/97.8 |
| 4,172,613 | 10/1979 | Furando | 296/97.7 |
| 4,958,879 | 9/1990 | Gillum | 296/97.9 X |
| 5,333,927 | 8/1994 | PreJean | 296/97.7 |

*Primary Examiner*—Joseph D. Pape
*Attorney, Agent, or Firm*—Michael P. Breston

[57] ABSTRACT

The visor includes a shade and a distinct coupler for pivotably and detachably coupling the shade to the fixed arm or shaft supporting the rear view mirror. The shade is sized to block out the direct low-incident sun rays passing through the windshield in the direction of the driver's eyes, so that they become shaded from the blinding bright light, especially during sunrises and sunsets. The dimensions of the visor are also selected so as not to significantly reduce the driver's vision of the road.

13 Claims, 2 Drawing Sheets

MOTOR VEHICLE AUXILIARY VISOR FOR BLOCKING OUT LOW INCIDENT SUN RAYS

BACKGROUND OF THE INVENTION

1. Field of the Invention

This invention relates generally to auxiliary sun visors for blocking out the most troublesome, low-incident sun rays which tend to blind the driver of a motor vehicle, particularly during sunrises and sunsets.

2. Description of the Prior Art

A motor vehicle such as an automobile is conventionally equipped with a pair of spaced-apart rectangular sun visors intended for shading the driver's eyes from glare but not to block out said troublesome sun rays.

Each such conventional visor is typically pivotably hinged above the windshield at two spaced-apart points to the car's body. An auxiliary visor is also available on the market for attachment to the bottom edge of this conventional visor to protect the eyes of the driver from low-incident sun rays, but these accessories dangerously reduce the driver's vision of the road and can interfere with the driver's steering ability. Short's U.S. Pat. No. 2,549,395 describes another type of auxiliary sun visor made to bridge the gap between the conventional sun visors and intended to impede direct sun rays from passing through this gap. Short's auxiliary sun visor is not intended to and cannot hinder the most troublesome low-incident sun rays passing underneath the conventional sun visor from impinging upon the eyes of and potentially blinding the vehicle's driver.

Therefore, there has been a long-felt need for new auxiliary visors that can overcome the above and other well-known problems of the prior art auxiliary visors when used by the driver, say in the middle of a busy freeway, while trying to read traffic directions from road signs, especially during sunrises and sunsets.

SUMMARY OF THE INVENTION

The novel auxiliary visor is for a moving vehicle having a pair of conventional sun visors, and a rear view mirror coupled to a shaft or arm connected to the body of the vehicle. The auxiliary sun visor includes a thin, flat shade and a coupler means connected to and forming part of the shade. The coupler means pivotably and detachably couples the shade to the rear view mirror shaft. In use the shade is rotated clockwise towards the driver from its rest position to a position so that it effectively prevents the direct low-incident sun rays passing through the windshield from reaching the eyes of the driver, say in the middle of a busy freeway, while trying to read traffic signs.

The shade's dimensions are selected for effective blocking of the direct sun rays without significantly reducing the driver's field of vision. In use, it is spaced from the windshield and rotated clockwise about the rear view mirror shaft to an angle so as to obstruct and nearly completely block out the direct sun rays from the driver's eyes, especially during sunrises and sunsets.

The coupler's body is made preferably of a resilient elastic material having dimensions selected for effectively coupling it to the shaft. The elastic material has a bore sized to snugly and resiliently embrace the external surface of the shaft while permitting the visor to rotate about the longitudinal axis of the shaft while maintaining a tight shaft embracing relation therebetween. The elastic body further has a straight slit defining opposite slit edges extending from the periphery of the bore to the top free edge of the elastic body to permit the shaft to slide between the opposite slit edges into and out of the bore.

DETAILED DESCRIPTION OF PREFERRED EMBODIMENTS

Figure 1:
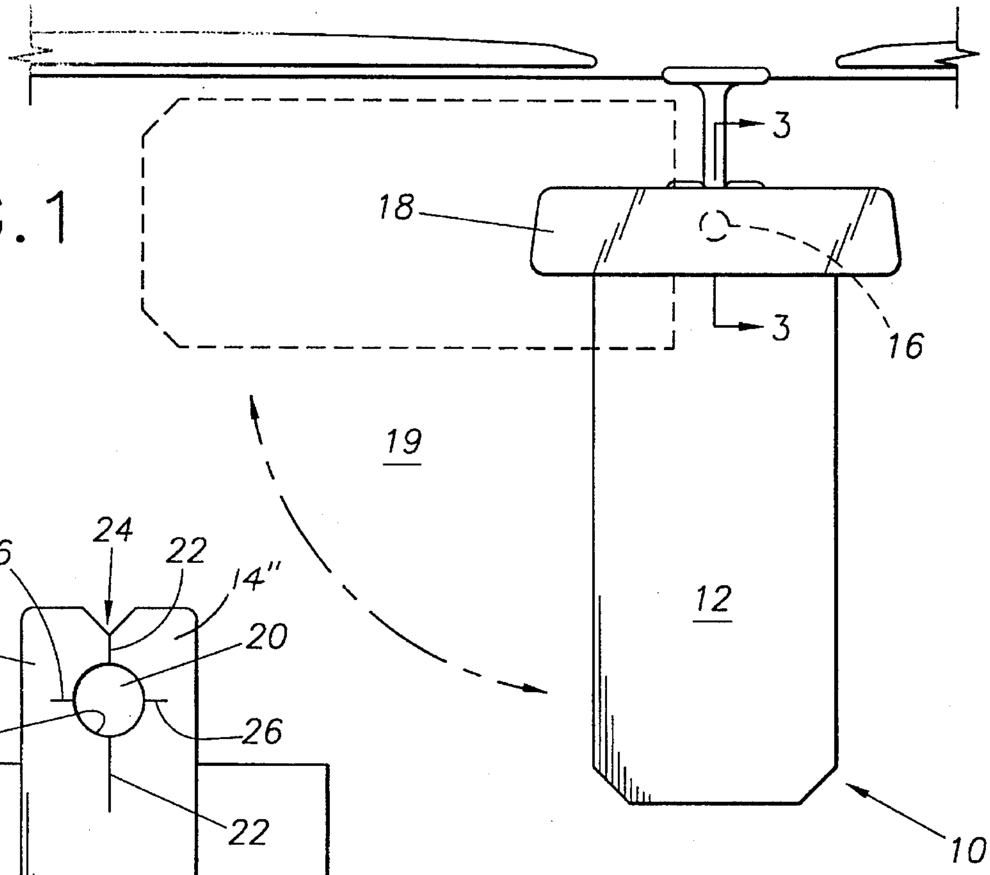
FIG. 1 is a view of the rear view mirror assembly and of the novel auxiliary visor, shown in its down vertically position, mounted on the shaft supporting the rear view mirror.
Figure 2:
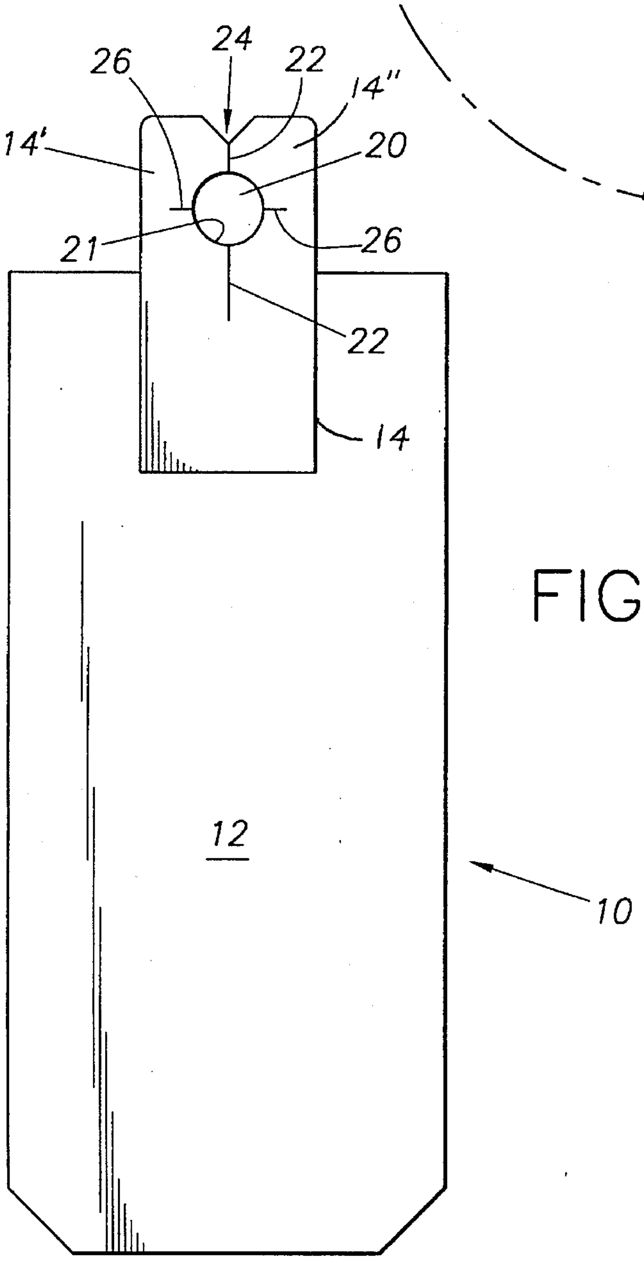
FIG. 2 is a planar front view of the visor itself.

FIGS. 1–2 show the novel auxiliary visor, generally designated as 10, which includes a shade 12 and a coupler means 14 for pivotably and detachably coupling the shade to the fixed arm or shaft 16 supporting the rear view mirror 18. Coupler means 14 allows visor 10 to rotate clockwise, shown by the dotted lines in FIG. 1, and to rotate counterclockwise to its rest position, as shown by the solid lines. The auxiliary visor 10, at any angular position thereof, blocks out the low-incident rays, passing underneath the car's conventional sun visor, but without unduly interfering with the driver's vision of the road.

In use, shade 12 is rotated to at such an angle relative to the vertical as to obstruct most of the direct sun rays passing through the windshield and traveling in the direction of the driver's eyes, especially during sunrises and sunsets.

Shade 12 is thin and preferably made of an opaque, light-weight flat material, which could be paper, plastic, laminated sheeting, metal, etc. This material should be resistant to oils, greases, solvents, fatigue and abrasion, have high thermal stability over a temperature range form −75° to 230° F. and under tough environmental conditions, in order to withstand the abuse to which such visors are normally subjected inside the car in winter and summer. Shade 12 preferably has an elongated rectangular shape whose minimum length and width dimensions are selected for effectively obstructing the direct, low incident sun rays, passing underneath the car'conventional sun visors, especially during sunrises and sunsets, from reaching the driver's eyes, but not to significantly reduce the driver's vision of the road.

The coupling means 14 is also a flat but thicker strip than shade 12, preferably having a generally rectangular shape, and made of a material characterized by sufficient elastic resilience, in that it has the capability to recover its size and shape after compressive deformation.

Near its top end, strip 14 has a bore 20 defined by a cylindrical wall 21. Bore 20 is sized and shaped to correspond to the sectional size and shape of the arm or shaft 16 supporting the rear view mirror 18. The bore's diameter is slightly less than the shaft's diameter so as to allow wall 21 to accommodate and snugly capture the shaft 16.

Figure 3:
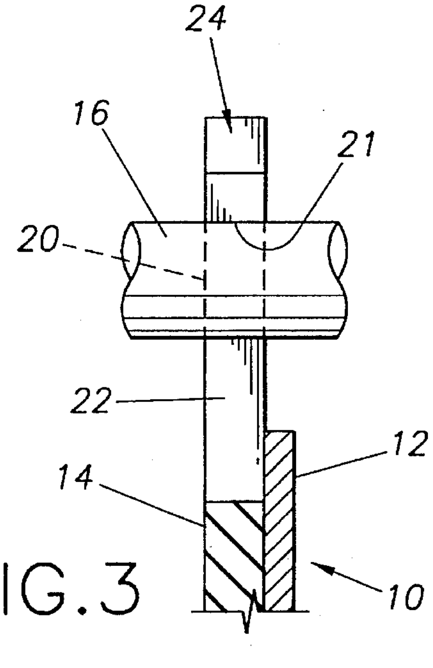
FIG. 3 is a vertical sectional view taken on line 3—3 of FIG. 1.

A straight slit 22 extends through a longitudinal diameter of bore 20 on either side of wall 21 and ends in a V-shaped mouth 24 which allows shaft 16 to slide into and out of the bore 20 by spreading apart the opposite edges of the slit 22 (FIG.3). Slit 22 divides the upper portion of the coupler's body into two resilient elastic prongs 14' and 14".

To allow bore 20 to accommodate a range of shaft sizes, at least two short, diametrically-opposed radial slits 26 can be provided which extend outwardly from the wall 21. These radial slits 26 allow the diameter of bore 20 to gradually enlarge so as to snugly and resiliently accommodating shafts of non-circular section or of larger diameters than the bore's diameter.

Coupler strip 14 can be secured to shade 12 by bonding using a suitable bonding agent.

The thickness of strip 14 is selected for providing enough resilient mass to its body for effective resilient coupling to shaft 16, i.e., to allow the opposite prongs 14',14" of coupler 14 to exert compressive radial forces on the outer surface of the shaft 16. Since shade 12 is relatively light weight, its lever action is not sufficient to overcome these compressive forces exerted against shaft 16 by the prongs 14',14".

In use, coupler 14 pivotably and detachably couples shade 12 to shaft 16, and when shade 12 is gradually rotated clockwise towards the driver from its vertical rest position (shown by solid lines in FIG. 1) to another desired position (shown by dotted lines), shade 12 effectively prevents the direct sun rays passing underneath the vehicle's conventional sun visor from reaching the eyes of the driver.

As such, auxiliary visor 10 is very importantly characterized by its amenability to relatively inexpensive mass-production techniques through the use of plastic fabrication technology or to unite shade 12 and coupler strip 14 by riveting.

It will be appreciated that auxiliary visor 10 is safe, trouble-free, and provides a completely new and unique approach to sun ray blocking at sunset and sunrise. It successfully accomplishes its objectives by virtue of its simplicity, flexibility, versatility, ease of assembly and economy of manufacture.

Figure 4:
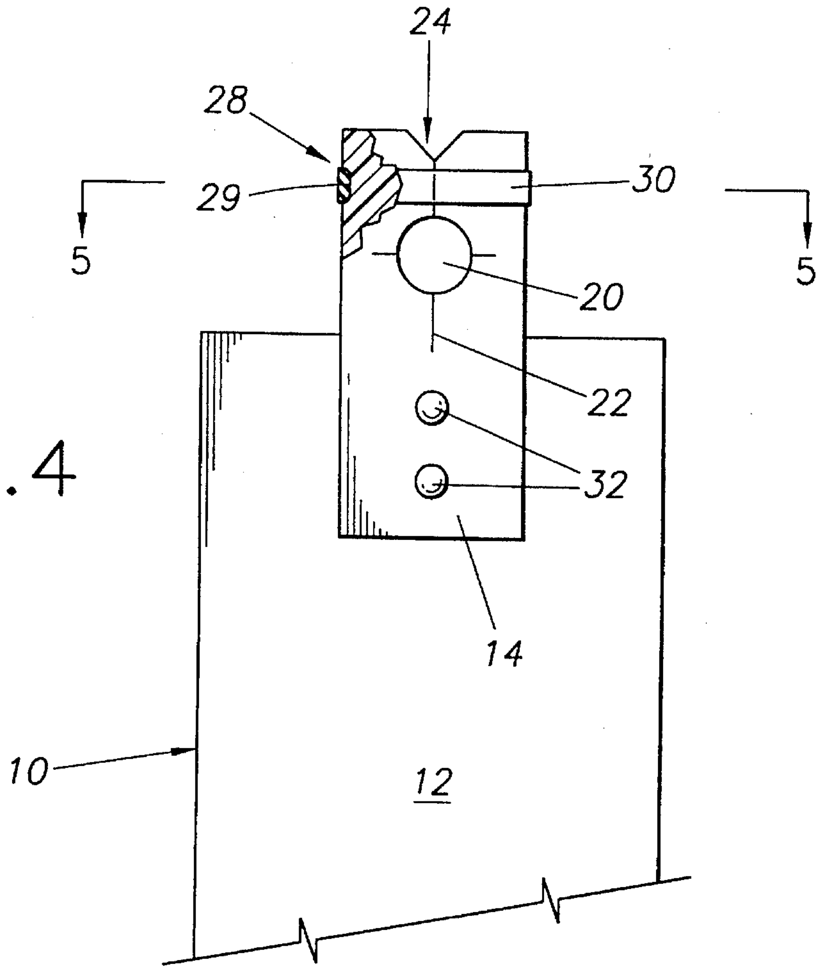
FIG. 4 shows a modified embodiment of the auxiliary visor's coupler which additionally includes a resilient clamping mechanism for enhancing the coupling forces exerted by the two prongs of the coupler on the external cylindrical surface of the rear view mirror's shaft.
Figure 5:
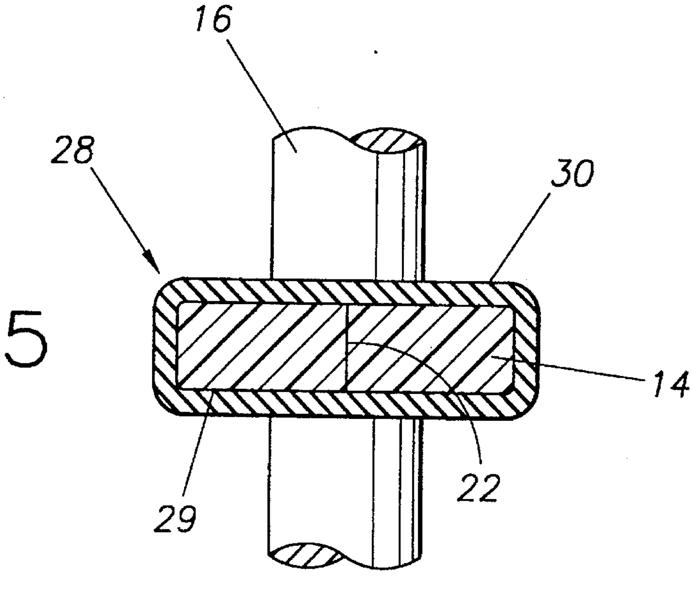
FIG. 5 is a view taken on line 5—5 of FIG. 4.

To further enhance the resilient coupling, between the if needed, opposite prongs 14',14" of body 14 and shaft 16, a mechanical clamping device, generally designated as 28, can be provided (FIGS. 4–5). For simplicity, the clamping device 28 is shown as an elastic band 30 which fits inside a groove 29 around the external peripheries of prongs 14',14" near the top free end of coupler 14, as shown. In this embodiment, coupler 14 is secured to shade 12 by mechanical rivets 32.

In use, visor 10 is donned by sliding shaft 16 through mouth 24 and slit 22 which causes the opposite edges thereof (FIG. 3) to spread apart and allows shaft 16 to slide into bore 20 and become fully captured therein. After the opposite slit edges return to their normal near contact position, then elastic band 30 is pushed down over the top free end of strip 14 and into groove 29, thereby further enhancing the resilient clamping forces exerted by the opposite prongs 14,14" of coupler 14 on the cylindrical surface of shaft 16.

What is claimed is:

1. An auxiliary visor for a moving vehicle having a rear view mirror coupled to a shaft or arm extending rearwardly of said rear view mirror, said auxiliary visor comprising:

a thin, flat shade;

resilient coupler means connected to and forming part of said shade for pivotably and detachably coupling said shade to said shaft so as to allow said shade to rotate clockwise in discrete angular steps towards said vehicle's driver from its rest position until said shade prevents the direct sun rays from reaching said driver's eyes; and a clamping device connected to the top free end of said coupler means for enhancing the coupler's resilient clamping action on the outer surface of said shaft.

2. The visor according to claim 1, wherein said shade has an elongated surface area sized to minimally interfere, at any discrete angular position thereof, with said driver's vision of the road.

3. The visor according to claim 2, wherein said shade has a generally elongated rectangular shape.

4. The visor according to claim 1, wherein said shade is made of a relatively light weight material.

5. The visor according to claim 1, wherein said coupler means is made, at least in part, of a resilient material for continuously exerting a resilient clamping action on said rear view mirror shaft while said shade rotates clockwise and counter-clockwise about the longitudinal axis of said shaft.

6. An auxiliary visor for a moving vehicle having a rear view mirror coupled to a shaft or arm extending rearwardly of said mirror, said auxiliary visor comprising:

a shade having a body exposing an elongated surface area; and distinct coupler means having a body for pivotably and detachably coupling said shade to said shaft for discrete clockwise and counter-clockwise angular rotations of said shade about the longitudinal axis of said rear view mirror shaft, toward and away from the vehicle's driver, whereby, in use, said driver can pivot said shade discretely from a rest position to an optimum position, whereat said shade's surface area is just sufficient to effectively block out low-incident sun rays and prevent them from reaching and adversely affecting said driver's eyes.

7. The auxiliary visor according to claim 6, wherein said vehicle has a pair of spaced apart left and right sun visors; and said shade, when in said optimum position, effectively prevents said low-incident sun rays, passing below said left sun visor, from reaching the eyes of said driver, especially during sunrises and sunsets, while minimally interfering with said driver's vision of the road and his steering ability.

8. The auxiliary visor according to claim 7, wherein said shade has a generally elongated rectangular shape.

9. The auxiliary visor according to claim 8, wherein said shade is made of a relatively light weight material.

10. The auxiliary visor according to claim 7, wherein said shade is made of an opaque, light-weight material having a substantially rectangular elongated shape.

11. The auxiliary visor according to claim 6, wherein said body of said distinct coupler means is connected to said body of said shade; and said body of said coupler means is made, at least in part, of a resilient material for continuously exerting a resilient clamping action on said rear view mirror shaft, during said clockwise and counter-clockwise angular rotations of said shade.

12. The auxiliary visor according to claim 11, wherein said coupler's resilient body has a bore whose peripheral wall is sized to snugly and resiliently capture therein the external surface of said rear view mirror shaft, and to allow for said discrete angular rotations by said shade about said longitudinal axis of said shaft.

13. The auxiliary visor according to claim 12, wherein said resilient coupler's body has a longitudinal narrow slit extending outwardly from said peripheral wall of said bore to the upper free end of said coupler's body.

* * * * *